United States Patent
Hu et al.

(10) Patent No.: US 11,428,909 B2
(45) Date of Patent: Aug. 30, 2022

(54) CAMERA SYSTEM

(71) Applicant: TDK TAIWAN CORP., Taoyuan (TW)

(72) Inventors: Chao-Chang Hu, Taoyuan (TW);
Chen-Hsien Fan, Taoyuan (TW);
Cheng-Kai Yu, Taoyuan (TW);
Chih-Wei Weng, Taoyuan (TW);
Shu-Shan Chen, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 55 days.

(21) Appl. No.: 16/993,565

(22) Filed: Aug. 14, 2020

(65) Prior Publication Data

US 2020/0371319 A1  Nov. 26, 2020

Related U.S. Application Data

(63) Continuation of application No. 16/159,004, filed on Oct. 12, 2018, now Pat. No. 10,775,596, which is a
(Continued)

(30) Foreign Application Priority Data

Mar. 3, 2017  (TW) .................................. 106106970

(51) Int. Cl.
*G02B 13/02* (2006.01)
*H04N 5/225* (2006.01)
(Continued)

(52) U.S. Cl.
CPC .............. *G02B 13/02* (2013.01); *G02B 7/09* (2013.01); *H02K 11/21* (2016.01);
(Continued)

(58) Field of Classification Search
CPC . G02B 13/02; G02B 7/09; G02B 7/08; H02K 11/21; H02K 41/0356;
(Continued)

(56) References Cited

U.S. PATENT DOCUMENTS 10,133,038 B2 * 11/2018 Hu ........................... G02B 7/09
10,775,596 B2 * 9/2020 Hu ..................... H02K 41/0356
(Continued)

FOREIGN PATENT DOCUMENTS

CN  104081272 A  10/2014
CN  203933331 U  11/2014
(Continued)

OTHER PUBLICATIONS

An Office Action in corresponding CN Application No. 201710249227.3 dated Apr. 24, 2019 is attached, 10 pages.
(Continued)

*Primary Examiner* — Abdelaaziz Tissire
(74) *Attorney, Agent, or Firm* — Muncy, Geissler, Olds & Lowe, P.C.

(57) ABSTRACT

A camera system including a telephoto lens module is provided. The telephoto lens module includes a first image sensor, a first assembly, and a second assembly. The first assembly includes a first driving mechanism and a reflecting member connected to the first driving mechanism. The first driving mechanism is configured to drive the reflecting member to rotate around a first axis and a second axis. The second assembly is disposed between the first assembly and the first image sensor, including a second driving mechanism and a first lens. The second driving mechanism is configured to drive the first lens to move along a third axis. The first, second, and third axes are not parallel to each other. When light enters the telephoto lens along the first
(Continued)

axis, light is reflected by the reflecting member and through the first lens along the third axis to the first image sensor.

20 Claims, 16 Drawing Sheets

Related U.S. Application Data continuation of application No. 15/589,198, filed on May 8, 2017, now Pat. No. 10,133,038.

(60) Provisional application No. 62/357,557, filed on Jul. 1, 2016, provisional application No. 62/334,090, filed on May 10, 2016.

(51) Int. Cl.
   H02K 11/21 (2016.01)
   H02K 41/035 (2006.01)
   H04N 5/232 (2006.01)
   H04N 5/247 (2006.01)
   G02B 7/09 (2021.01)
   G02B 7/08 (2021.01)

(52) U.S. Cl.
   CPC ....... H02K 41/0356 (2013.01); H04N 5/2254 (2013.01); H04N 5/2258 (2013.01); H04N 5/23296 (2013.01); H04N 5/247 (2013.01); G02B 7/08 (2013.01)

(58) Field of Classification Search
   CPC .............. H04N 5/2254; H04N 5/2258; H04N 5/23296; H04N 5/247
   See application file for complete search history.

(56) References Cited

U.S. PATENT DOCUMENTS

| | | |
|---|---|---|
| 2006/0187338 A1 | 8/2006 | May et al. |
| 2006/0209437 A1 | 9/2006 | Miyamoto |
| 2006/0268431 A1 | 11/2006 | Jin |
| 2007/0133967 A1 | 6/2007 | Takahashi |
| 2008/0084622 A1 | 4/2008 | Ishimoda et al. |
| 2008/0129831 A1 | 6/2008 | Cho et al. |
| 2010/0033820 A1 | 2/2010 | Omi |
| 2011/0096178 A1 | 4/2011 | Ryu et al. |
| 2011/0267692 A1 | 11/2011 | Watanabe et al. |
| 2012/0128339 A1* | 5/2012 | Hu .......................... G03B 5/06 396/55 |
| 2012/0249815 A1 | 10/2012 | Bohn et al. |
| 2013/0278785 A1 | 10/2013 | Nomura |
| 2014/0063331 A1* | 3/2014 | Goldenberg ......... G02B 13/009 348/357 |
| 2015/0002683 A1 | 1/2015 | Hu et al. |
| 2015/0042870 A1* | 2/2015 | Chan ....................... G02B 7/102 348/357 |
| 2015/0215542 A1* | 7/2015 | Nomura ............... H04N 5/2254 348/208.11 |
| 2016/0007008 A1 | 1/2016 | Molgaard |
| 2016/0044247 A1* | 2/2016 | Shabtay ............... H04N 5/2254 348/240.3 |
| 2016/0044250 A1* | 2/2016 | Shabtay ............... H04N 5/2257 348/240.3 |
| 2016/0134813 A1 | 5/2016 | Hu |
| 2016/0154198 A1 | 6/2016 | Alasimio |
| 2017/0235093 A1* | 8/2017 | Sekiguchi ................ G02B 7/09 359/824 |
| 2017/0294476 A1 | 10/2017 | Hu et al. |
| 2017/0329111 A1 | 11/2017 | Hu |
| 2017/0329151 A1 | 11/2017 | Hu et al. |
| 2018/0017844 A1* | 1/2018 | Yu ............................. G03B 5/02 |
| 2018/0024329 A1* | 1/2018 | Goldenberg ......... G02B 27/646 359/557 |
| 2018/0095293 A1* | 4/2018 | Yeon ....................... H02P 6/006 |
| 2018/0109660 A1* | 4/2018 | Yoon .................. H04N 5/23264 |
| 2018/0109710 A1 | 4/2018 | Lee et al. |
| 2018/0136438 A1 | 5/2018 | Ho et al. |
| 2018/0188476 A1 | 7/2018 | Hu et al. |
| 2018/0217475 A1* | 8/2018 | Goldenberg ............. G03B 3/10 |
| 2018/0224088 A1 | 8/2018 | Park et al. |
| 2019/0049687 A1 | 2/2019 | Bachar et al. |
| 2019/0377155 A1* | 12/2019 | Bachar ................. H04N 5/2254 |

FOREIGN PATENT DOCUMENTS

| | | |
|---|---|---|
| CN | 104656342 A | 5/2015 |
| CN | 204422843 U | 6/2015 |
| CN | 105408806 A | 3/2016 |
| CN | 105549305 A | 5/2016 |
| CN | 105556385 A | 5/2016 |
| TW | 201413318 A | 4/2014 |
| TW | 201511554 A | 3/2015 |
| WO | WO-2014/072818 A2 | 5/2014 |

OTHER PUBLICATIONS

Office Action dated Mar. 25, 2021 in Chinese Application No. 201910700259.X, 5 pages.

India Office Action cited in counterpart Application No. 202025044730, dated Jan. 31, 2022, 5 pages.

India Office Action cited in counterpart Application No. 202025044749, dated Jan. 31, 2022, 5 pages.

* cited by examiner

CAMERA SYSTEM

CROSS REFERENCE TO RELATED APPLICATIONS

The application is a continuation application of the U.S. application Ser. No. 16/159,004, filed on Oct. 12, 2018, which is a continuation application of the U.S. application Ser. No. 15/589,198 filed on May 8, 2017, which claims priority of provisional U.S. Patent Application Ser. No. 62/334,090 filed on May 10, 2016, provisional U.S. Patent Application Ser. No. 62/357,557 filed on Jul. 1, 2016, and Taiwan Patent Application No. 106106970 filed on Mar. 3, 2017, the entirety of which are incorporated by reference herein.

BACKGROUND OF THE DISCLOSURE

Field of the Invention

The present invention relates to a camera system, and more particularly to a camera system having a telephoto lens module.

Description of the Related Art

As the relevant technologies have developed, cameras have been applied widely in portable electronic devices, such as cell phones and tablet computers. However, when a long focal length lens is applied in an electronic device, the thickness thereof may adversely impede the prospects for miniaturization of the electronic device.

BRIEF SUMMARY OF THE DISCLOSURE

Accordingly, one objective of the present invention is to provide a camera system including a telephoto lens module. The telephoto lens module includes a first image sensor, a first assembly, and a second assembly. The first assembly includes a first driving mechanism and a reflecting member connected to the first driving mechanism, wherein the first driving mechanism is configured to drive the reflecting member to rotate around a first axis and a second axis. The second assembly is disposed between the first assembly and the first image sensor, including a second driving mechanism and a first lens, wherein the second driving mechanism is configured to drive the first lens to move along a third axis. The first, second, and third axes are not parallel to each other, and when light enters the telephoto lens along the first axis, light is reflected by the reflecting member and through the first lens along the third axis to the first image sensor.

According to some embodiments of the disclosure, the second driving mechanism includes a holder holding the first lens, two third axial coils, disposed on opposite sides of the holder, two third axial magnetic elements corresponding to the third axial coils, a frame having a hollow portion for receiving the holder, and two resilient elements connecting the holder to the frame, wherein the frame is disposed between the two resilient elements, and the third axial magnetic elements are disposed on the frame.

According to some embodiments of the disclosure, the second driving mechanism further includes a second axial coil, and when an electrical current is applied to the second axial coil, a magnetic force is generated between the second axial coil and the third axial magnetic elements to move the first lens along the second axis.

According to some embodiments of the disclosure, the second driving mechanism further includes a first axial coil and a plurality of first axial magnetic elements, wherein the first axial magnetic elements are disposed between the first axial coil and the holder, and the holder is disposed between the first and second axial coils.

According to some embodiments of the disclosure, the camera system further includes a wide angle lens module having a second lens and a second image sensor, wherein light enters the wide angle lens module along the first axis and propagates through the second lens to the second image sensor.

Another objective of the present invention is to provide a camera system including a telephoto lens module. The telephoto lens module includes a first image sensor, a first assembly, and a second assembly. The first assembly includes a first driving mechanism and a reflecting member connected to the first driving mechanism, wherein the first driving mechanism is configured to drive the reflecting member to rotate around a second axis. The second assembly is disposed between the first assembly and the first image sensor, including a second driving mechanism and a first lens, wherein the second driving mechanism is configured to drive the first lens to move along the second axis and a third axis. When light enters the telephoto lens along a first axis, light is reflected by the reflecting member and through the first lens along the third axis to the first image sensor, and the first, second, and third axes are not parallel to each other.

Another objective of the present invention is to provide a camera system including a telephoto lens module. The telephoto lens module includes a first image sensor, a first assembly, and a second assembly. The first assembly includes a reflecting member.

The second assembly is disposed between the first assembly and the first image sensor, including a second driving mechanism and a first lens, wherein the second driving mechanism is configured to drive the first lens to move along a first axis, a second axis, and a third axis. When light enters the telephoto lens along the first axis, light is reflected by the reflecting member and through the first lens along the third axis to the first image sensor, and the first, second, and third axes are not parallel to each other.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it should be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1:
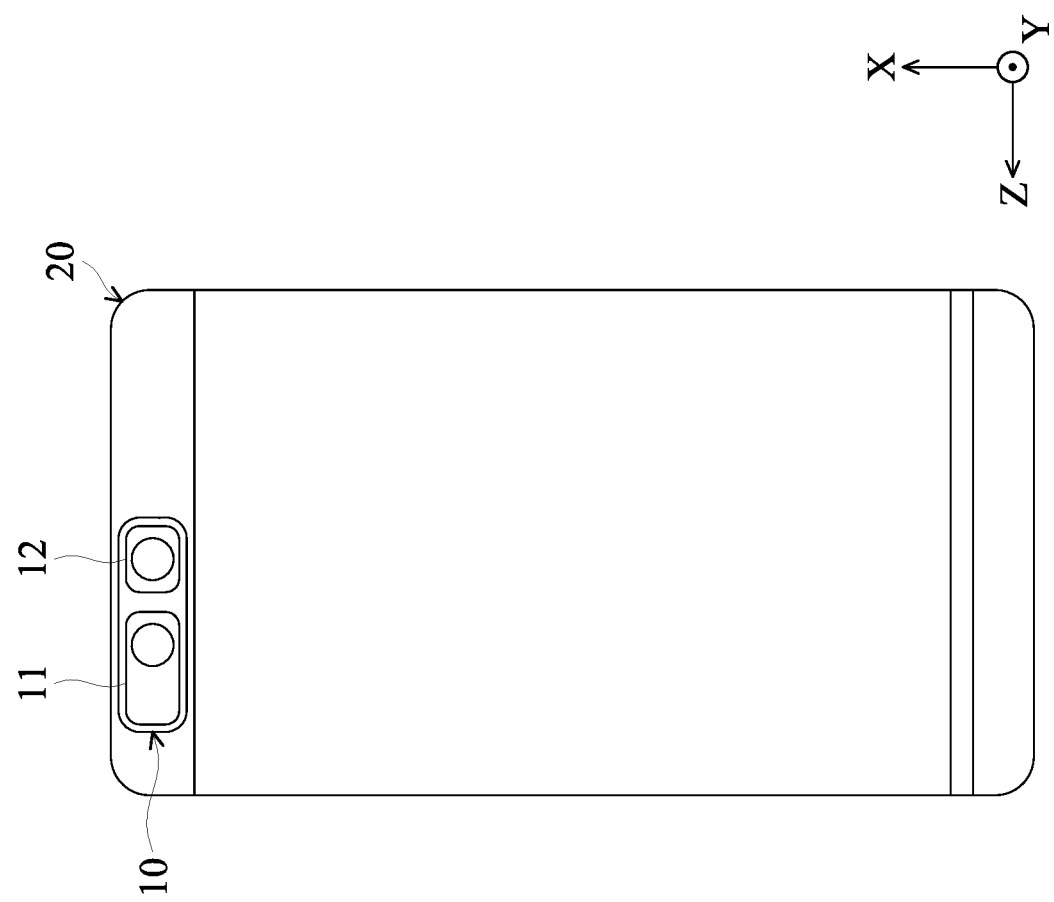
FIG. 1 shows a perspective diagram of an electronic device, in accordance with an embodiment of the invention.

Referring to FIG. 1, a camera system 10 according to an embodiment of the invention is disposed in an electronic device 20 such as smart phone or digital camera for photographing or video recording. The camera system 10 includes a telephoto lens module 11 and a wide angle lens module 12 respectively receiving light and generating an image. The images generated by the telephoto lens module 11 and the wide angle lens module 12 are subsequently transferred to a processor (not shown) in the electronic device 20 for image post processing.

Figure 2:
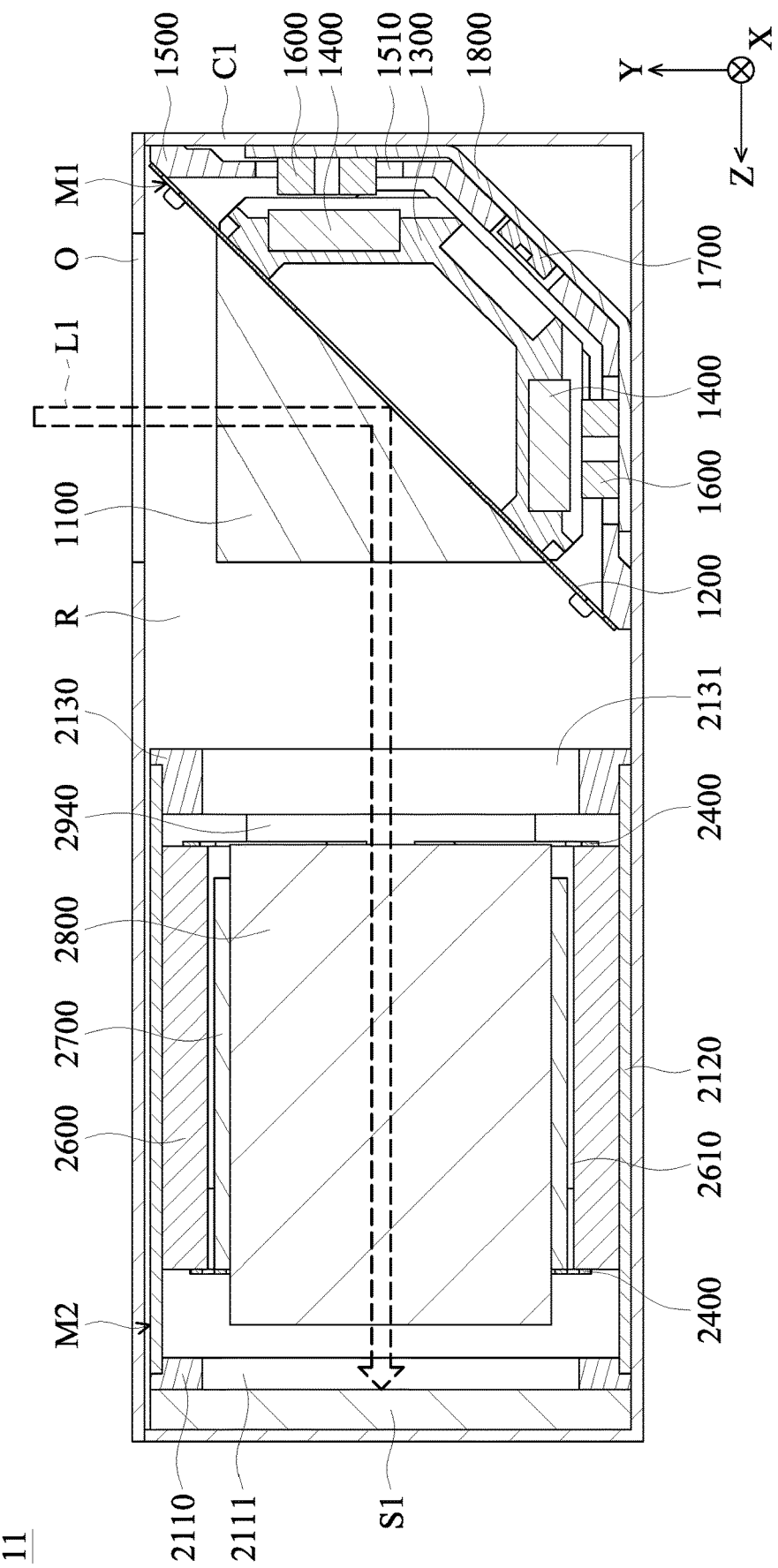
FIG. 2 shows a cross-sectional view of a telephoto lens module, in accordance with an embodiment of the invention.

As shown in FIG. 2, the telephoto lens module 11 primarily comprises a housing C1, a first assembly M1, a second assembly M2, and a first image sensor S1, wherein the second assembly M2 is capable of auto focusing (AF) and optical image stabilization (OIS). The housing C1 forms a receiving space R communicated with an opening O on an upper surface of the housing C1. The first assembly M1, the second assembly M2, and the first image sensor S1 are disposed in the receiving space R. Specifically, the second assembly M2 is disposed between the first assembly M1 and the first image sensor S1, and the opening O is located right above the first assembly M1.

When external light L1 enters the telephoto lens module 11 along the Y axis (first axis) through the opening O to the receiving space R, light L1 is reflected by the first assembly M1 and propagates through the second assembly M2 substantially along the Z axis (third axis) to the first image sensor S1, so that an image can be generated on the first image sensor S1.

Figure 3:
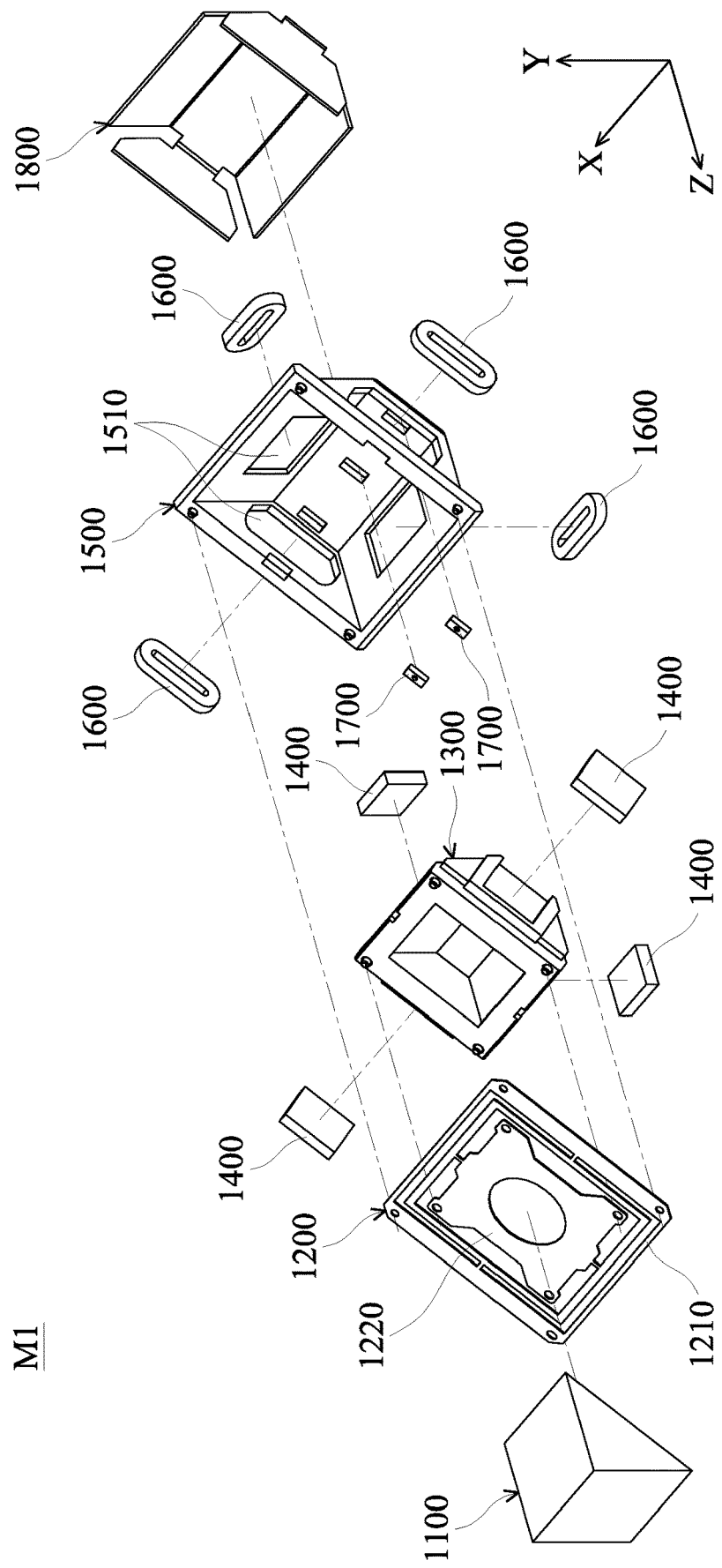
FIG. 3 shows an exploded diagram of the first assembly M1 in FIG. 2.

Referring to FIGS. 2 and 3, FIG. 3 shows an exploded view of the first assembly M1 of the telephoto lens module 11. The first assembly M1 includes a reflecting element 1100 and a first driving mechanism, wherein the first driving mechanism includes a first resilient element 1200, a first holder 1300, a plurality of first magnetic elements 1400, a first frame 1500, a plurality of coils 1600, a plurality of position detectors 1700, and a first printed circuit board 1800.

The first resilient element 1200 has an outer section 1210 and an inner section 1220, wherein the first frame 1500 is connected to the outer section 1210, and the reflecting element 1100 and the first holder 1300 are respectively affixed to opposite sides of the inner section 1220. That is, the reflecting element 1100 and the first holder 1300 are connected via the first resilient element 1200. The first magnetic elements 1400 are affixed to and arranged around the first holder 1300.

The first printed circuit board 1800 is affixed to the housing C1, and the first frame 1500, the coils 1600, and the position detectors 1700 are affixed to the first printed circuit board 1800. The coils 1600 and the position detectors 1700 may extend through the holes 1510 on the frame 1500 and correspond to the first magnetic elements 1400, whereby the position detectors 1700 can detect the positions of the first magnetic elements 1400.

The reflecting element 1100 and the first holder 1300 can be suspended within the first frame 1500 via the first resilient element 1200. When electrical current is applied to the coils 1600, magnetic forces are generated between the coils 1600 and the first magnetic elements 1400, so that the reflecting element 1100 and the first holder 1300 can rotate relative to the first frame 1500 around the Y axis (first axis) or/and the X axis (second axis), to finely adjust the direction of the light L1 toward the first image sensor S1.

Figure 4:
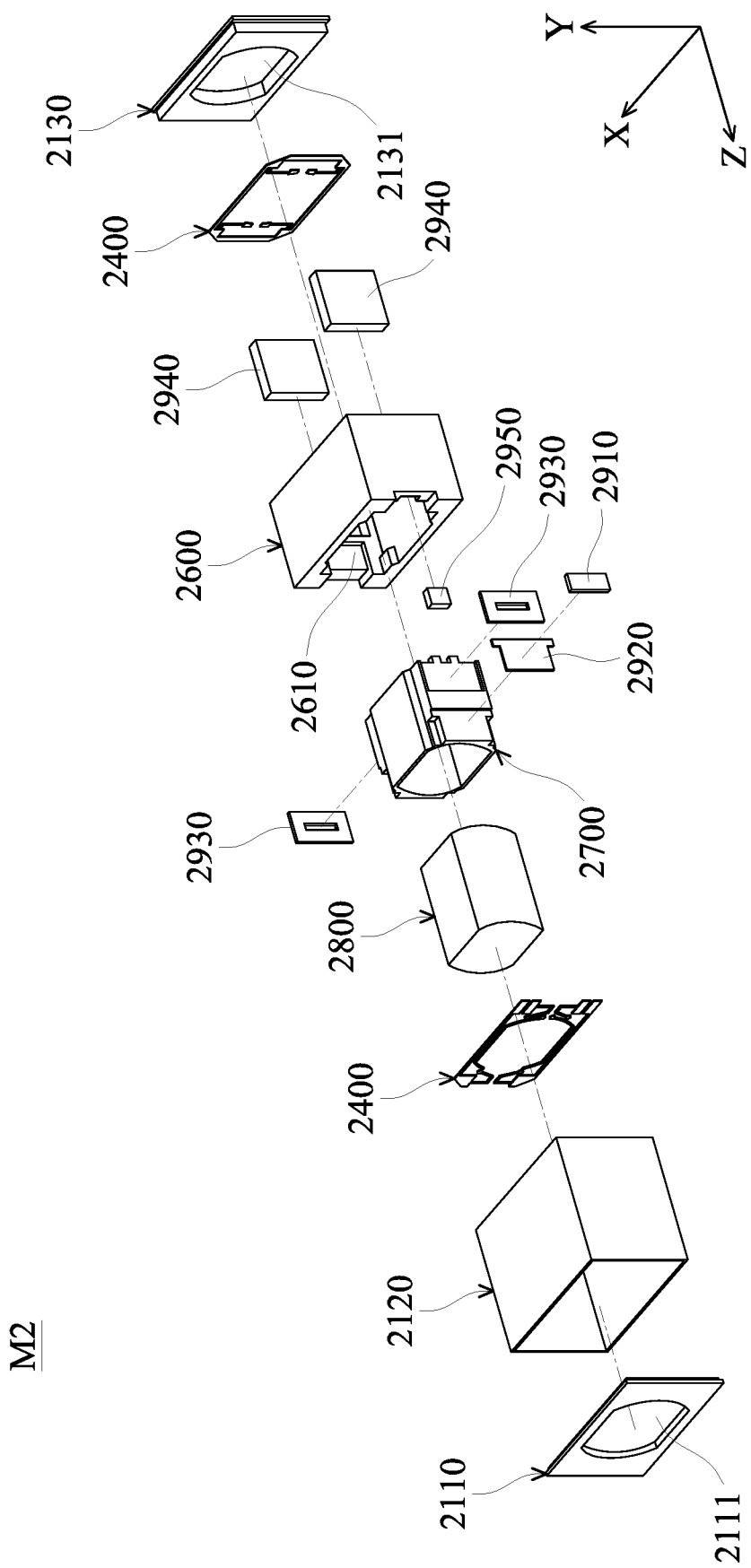
FIG. 4 shows an exploded diagram of the second assembly M2 in FIG. 2.

FIG. 4 shows an exploded view of the second assembly M2 of the telephoto lens module 11. As shown in FIGS. 2 and 4, the second assembly M2 primarily includes a top cover 2110, a casing 2120, a bottom cover 2130, a first lens 2800, and a second driving mechanism, wherein the second driving mechanism includes two second resilient elements 2400, a second frame 2600, a second holder 2700, a third axial position sensor 2910, a third axial printed circuit board 2920, two third axial coils 2930, two third axial magnetic elements 2940, and a third axial sensing object 2950.

The two second resilient elements 2400 are located on opposite sides of the second holder 2700 and connect the second frame 2600 with the second holder 2700, so that the second holder 2700 is suspended and movable within a hollow portion 2610 of the second frame 2600. As the first lens 2800 is fixed in the second holder 2700, both the first lens 2800 and the second holder 2700 are movable relative to the second frame 2600. Here, the first lens 2800 is disposed in and supported by the second holder 2700.

The third axial coils 2930 in FIGS. 2 and 3 are disposed on the second holder 2700, and the second magnetic elements 2940 are disposed on the second frame 2600, corresponding to the third axial coils 2930. Here, the third axial coils 2930 are arranged on opposite sides of the second holder 2700, and the two second magnetic elements 2940 are arranged on the inner surfaces of the second frame 2600. When an electrical current is applied to the third axial coil 2930, a magnetic force is generated between the third axial coil 2930 and the second magnetic elements 2940 to move the second holder 2700 and the first lens 2800 relative to the second frame 2600 along the Z axis, so as to achieve the function of auto focusing (AF).

The third axial sensing object 2950 is affixed to the second frame 2600, the third axial printed circuit board 2920 is affixed to the second holder 2700, and the third axial position sensor 2910 is disposed on the third axial printed circuit board 2920. In this configuration, when the second holder 2700 and the first lens 2800 received therein move relative to the second frame 2600 along the Z axis, the third axial printed circuit board 2920 and the third axial position sensor 2910 also move relative to the second frame 2600 along the Z axis. Thus, the positions of the second holder 2700 and the first lens 2800 relative to the second frame 2600 along the Z axis can be determined by the third axial position sensor 2910 detecting the relative position of the third axial sensing object 2950.

The third axial position sensor 2910 may be a Hall, MR (Magneto Resistance), GMR (Giant Magneto Resistance), or TMR (Tunneling Magneto Resistance) sensor. In some embodiments, the third axial position sensor 2910 may be an optical or infrared sensor. When the third axial position sensor 2910 is a Hall, MR, GMR, or TMR sensor, the third axial sensing object 2950 may be a magnet. When the third axial position sensor 2910 is an optical or infrared sensor, the third axial sensing object 2950 may be a light reflecting sheet.

Still referring to FIG. 4, the top and bottom covers 2110 and 2130 are disposed on opposite sides of the casing 2120 and form a box-shaped structure. The second resilient elements 2400, the second frame 2600, the second holder 2700, the first lens 2800, the third axial position sensor 2910, the third axial printed circuit board 2920, the third axial coil 2930, the third axial magnetic element 2940, and the third axial sensing object 2950 are all received in the box-shaped structure.

As the top cover 2110, the casing 2120, and the bottom cover 2130 comprise non-conductive material, a short circuit between the second assembly M2 and other electronic component can be avoided. It should be noted that the top cover 2110 and the bottom cover 2130 respectively form a hole 2111 and 2131 corresponding to the first lens 2800. Light L1 can be reflected by the first assembly M1 (FIG. 2) and propagate sequentially through the hole 2131, the first lens 2800, and the hold 2111 to the first image sensor S1 along the Z axis.

In this embodiment, as the first driving mechanism of the first module M1 can drive the reflecting element 1100 to rotate around the Y axis (first axis) and the X axis (second axis), the reflecting direction of light L1 can be finely adjusted to project onto a correct position of the first image sensor S1, so as to achieve optical image stabilization (OIS). Additionally, as the second driving mechanism of the second assembly M2 can drive the first lens 2800 to move along the Z axis (third axis), the distance between the first lens 2800 and the first image sensor S1 can be rapidly adjusted to achieve auto focusing (AF). It is clearly shown in FIG. 4 that since no magnetic element is disposed on the upper and lower sides of the second holder 2700, the dimensions and thickness of the second assembly M2 and the telephoto lens module 11 along the Y axis can be greatly reduced.

Figure 5:
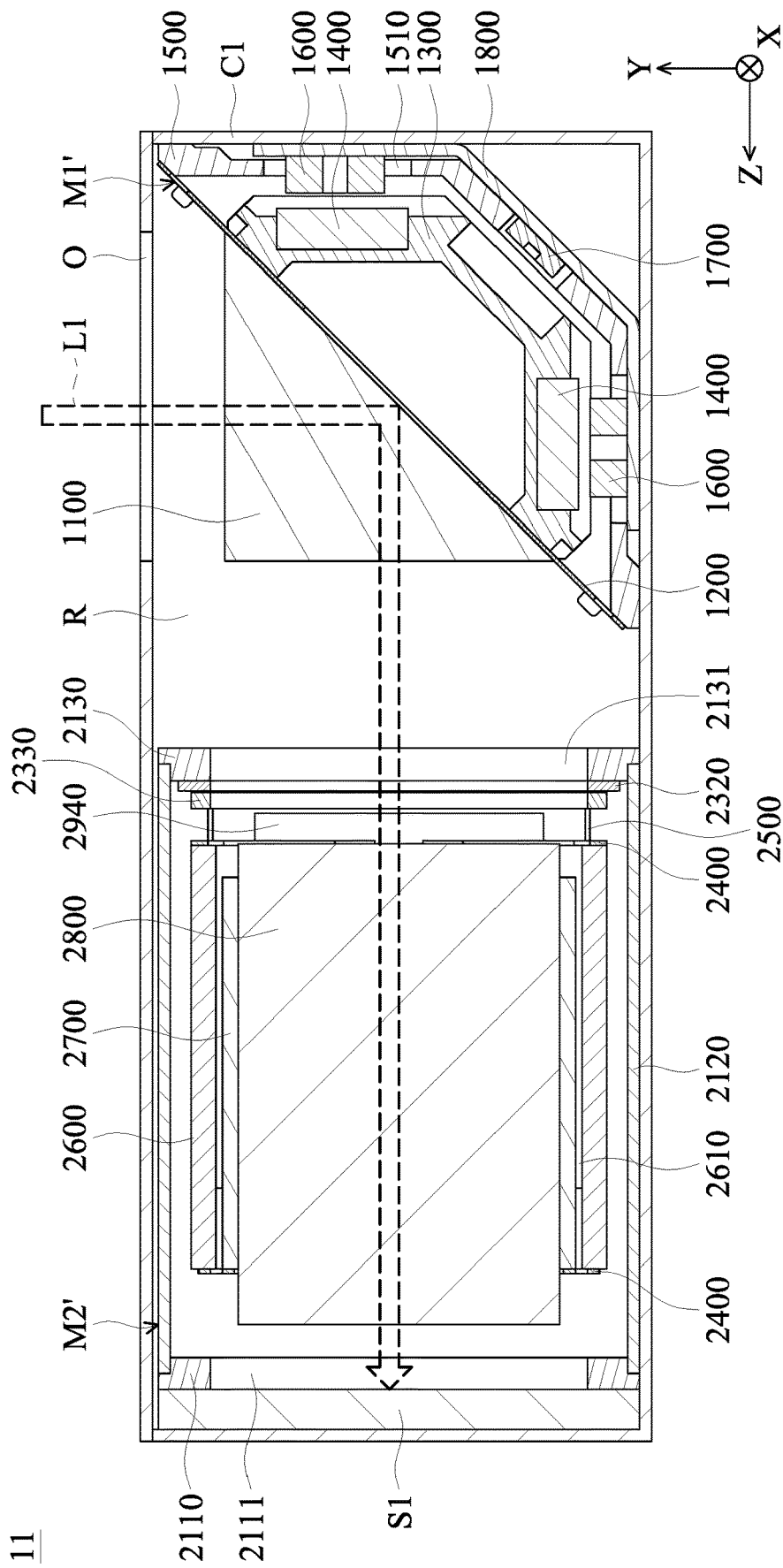
FIG. 5 shows a cross-sectional view of a telephoto lens module, in accordance with another embodiment of the invention.
Figure 6:
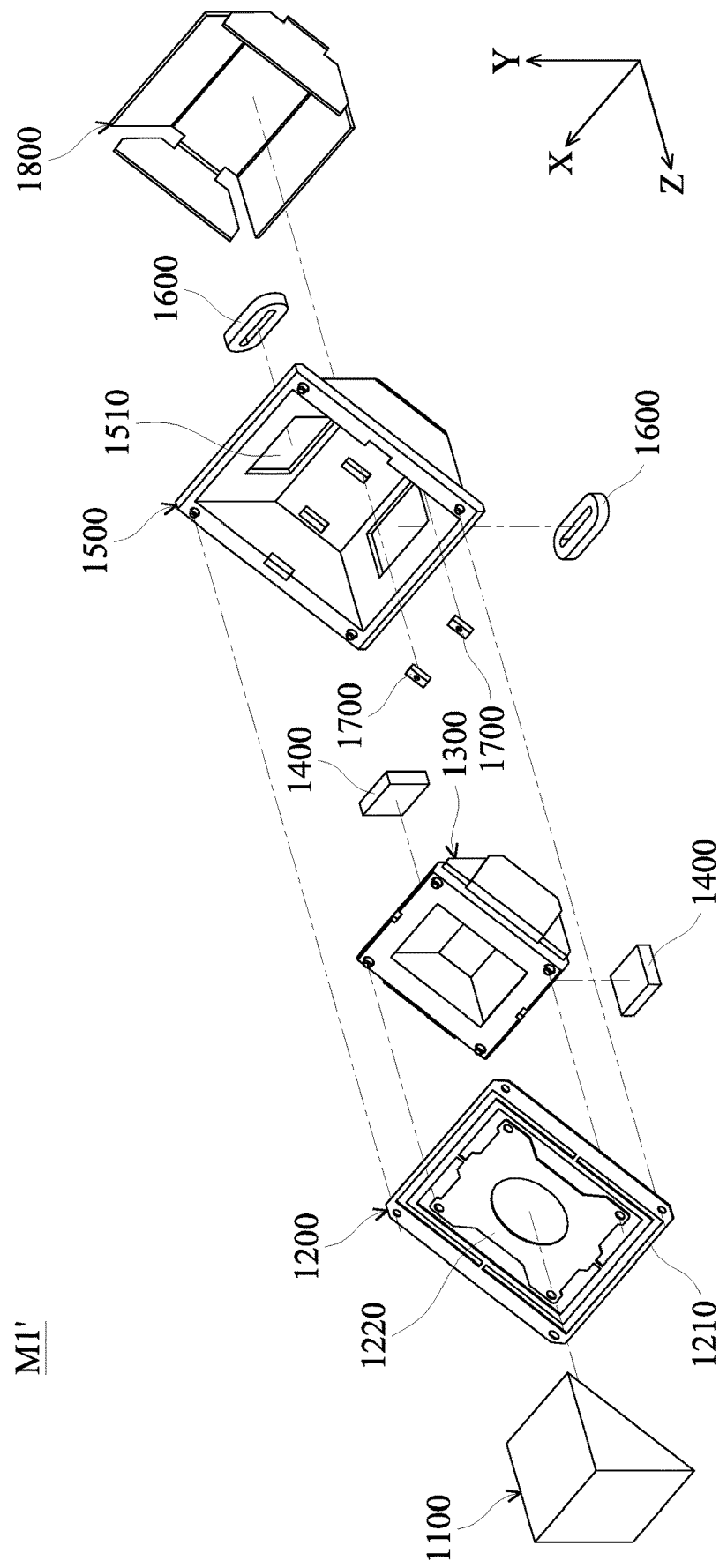
FIG. 6 shows an exploded diagram of the first assembly M1' in FIG. 5.
Figure 7:
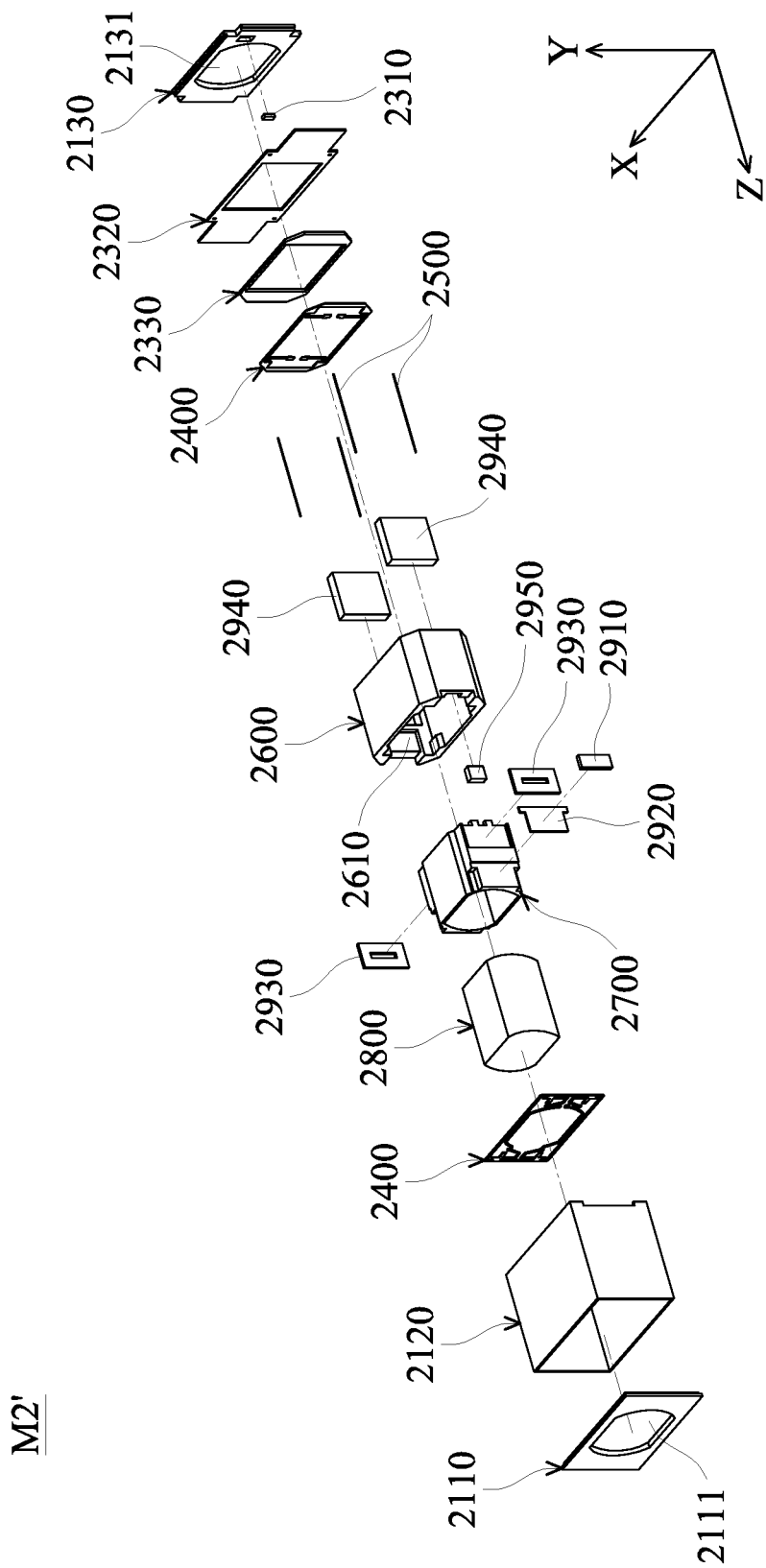
FIG. 7 shows an exploded diagram of the second assembly M2' in FIG. 5.

FIG. 5 shows a cross-sectional view of a telephoto lens module 11 according to another embodiment of the invention, and FIGS. 6 and 7 respectively show exploded diagrams the first assembly M1' and the second assembly M2' in FIG. 5. As shown in FIGS. 5 and 6, the first assembly M1' includes a first reflecting element 1100 and a first driving mechanism, wherein the first driving mechanism includes a first resilient element 1200, a first holder 1300, two first magnetic elements 1400, a first frame 1500, a plurality of coils 1600, a plurality of position detectors 1700, and a first printed circuit board 1800.

The first resilient element 1200 has an outer section 1210 and an inner section 1220, wherein the first frame 1500 is connected to the outer section 1210, and the reflecting element 1100 and the first holder 1300 are respectively affixed to opposite sides of the inner section 1220. That is, the reflecting element 1100 and the first holder 1300 are connected via the first resilient element 1200. The first magnetic elements 1400 are affixed to opposite sides of the first holder 1300.

The first printed circuit board 1800 is affixed to the housing C1, and the first frame 1500, the coils 1600, and the position detectors 1700 are affixed to the first printed circuit board 1800. The coils 1600 and the position detectors 1700 may extend through the holes 1510 on the frame 1500 and correspond to the first magnetic elements 1400, whereby the position detectors 1700 can detect the positions of the first magnetic elements 1400.

The reflecting element 1100 and the first holder 1300 can be suspended within the first frame 1500 via the first resilient element 1200. When an electrical current is applied to the coils 1600, a magnetic force is generated between the coils 1600 and the first magnetic elements 1400, so that the reflecting element 1100 and the first holder 1300 rotate relative to the first frame 1500 around the X axis (second axis), to finely adjust the direction of the light L1 toward the first image sensor S1.

Referring to FIGS. 5 and 7, the second assembly M2' primarily includes a top cover 2110, a casing 2120, a bottom cover 2130, a first lens 2800, and a second driving mechanism, wherein the second driving mechanism includes a second axial position sensor 2310, a second axial printed circuit board 2320, a second axial coil 2330, two second resilient elements 2400, a second frame 2600, a second holder 2700, a third axial position sensor 2910, a third axial printed circuit board 2920, two third axial coils 2930, two third axial magnetic elements 2940, and a third axial sensing object 2950.

The two second resilient elements 2400 are located on opposite sides of the second holder 2700 and connect the second frame 2600 with the second holder 2700, so that the second holder 2700 is suspended and movable within a hollow portion 2610 of the second frame 2600. As the first lens 2800 is fixed in the second holder 2700, both the first lens 2800 and the second holder 2700 are movable relative to the second frame 2600. Here, the first lens 2800 is disposed in and supported by the second holder 2700.

The third axial coils 2930 are disposed on the second holder 2700, and the second magnetic elements 2940 are disposed on the second frame 2600, corresponding to the third axial coils 2930. Here, the third axial coils 2930 are arranged on opposite sides of the second holder 2700, and the two second magnetic elements 2940 are arranged on the inner surfaces of the second frame 2600. When an electrical current is applied to the third axial coil 2930, a magnetic force is generated between the third axial coil 2930 and the second magnetic elements 2940 to move the second holder 2700 and the first lens 2800 relative to the second frame 2600 along the Z axis (third axis), so as to achieve the function of auto focusing (AF).

The third axial sensing object 2950 is affixed to the second frame 2600, the third axial printed circuit board 2920 is affixed to the second holder 2700, and the third axial position sensor 2910 is disposed on the third axial printed circuit board 2920. In this configuration, when the second holder 2700 and the first lens 2800 received therein move relative to the second frame 2600 along the Z axis, the third axial printed circuit board 2920 and the third axial position sensor 2910 also move relative to the second frame 2600 along the Z axis. Thus, the positions of the second holder 2700 and the first lens 2800 relative to the second frame 2600 along the Z axis can be determined by the third axial position sensor 2910 detecting the relative position of the third axial sensing object 2950.

The second axial printed circuit board 2320 and the second axial coil 2330 are disposed between the bottom cover 2130 and the second holder 2700, and the second axial position sensor 2310 and the second axial coil 2330 are disposed on the second axial printed circuit board 2320. The second axial position sensor 2310 is used for detecting the position of the second magnetic element 2940 along the X axis. It should be noted that the second frame 2600, the second holder 2700, and the first lens 2800 can be supported by a plurality of flexible members 2500 (such as metal wires) for connecting the second axial printed circuit board 2320 to the second resilient element 2400 which is near the first magnetic elements 2240, so that the second frame 2600, the second holder 2700, and the first lens 2800 can move relative to the first and second axial printed circuit boards 2220 and 2320 along the X axis.

When an electrical current is applied to the second axial coil 2330, a magnetic force is generated between the second axial coil 2330 and the second magnetic element 2940 to move the second frame 2600, the second holder 2700, and the first lens 2800 relative to the second axial printed circuit board 2320 along the X axis, so as to achieve the function of optical image stabilization (OIS).

The second and third axial position sensors 2310 and 2910 may be Hall, MR (Magneto Resistance), GMR (Giant Magneto Resistance), or TMR (Tunneling Magneto Resistance) sensors. In some embodiments, the third axial position sensor 2910 may be an optical or infrared sensor. When the third axial position sensor 2910 is a Hall, MR, GMR, or TMR sensor, the third axial sensing object 2950 may be a magnet. When the third axial position sensor 2910 is an optical or infrared sensor, the third axial sensing object 2950 may be a light reflecting sheet.

Referring to FIG. 7, the top and bottom covers 2110 and 2130 are disposed on opposite sides of the casing 2120 and form a box-shaped structure. The second axial position sensor 2310, the second axial printed circuit board 2320, the second axial coil 2330, the second resilient elements 2400, the flexible members 2500, the second frame 2600, the second holder 2700, the first lens 2800, the third axial position sensor 2910, the third axial printed circuit board 2920, the third axial coil 2930, the third axial magnetic element 2940, and the third axial sensing object 2950 are all received in the box-shaped structure.

As the top cover 2110, the casing 2120, and the bottom cover 2130 comprise non-conductive material, a short circuit between the first and second assemblies M1' and M2' can be avoided. It should be noted that the top cover 2110 and the bottom cover 2130 respectively form a hole 2111 and 2131 corresponding to the first lens 2800. Light L1 can be reflected by the first assembly M1' and propagate sequentially through the hole 2131, the first lens 2800, and the hold 2111 to the first image sensor S1 along the Z axis.

In this embodiment, as the first driving mechanism of the first module M1' can drive the reflecting element 1100 to rotate around the X axis (second axis), the reflecting direction of light L1 can be finely adjusted to project onto a correct position of the first image sensor S1. Additionally, as the second driving mechanism of the second assembly M2' can drive the first lens 2800 to move along the X axis (second axis), optical image stabilization (OIS) of the telephoto lens module 11 can therefore be achieved. Moreover, as the second driving mechanism of the second assembly M2' can drive the first lens 2800 to move along the Z axis (third axis), the distance between the first lens 2800 and the first image sensor S1 can be rapidly adjusted to achieve auto focusing (AF). It should be noted that since no magnetic element is disposed on the upper and lower sides of the second holder 2700, as shown in FIG. 4, the dimensions and thickness of the second assembly M2 and the telephoto lens module 11 along the Y axis can be greatly reduced.

Figure 8:
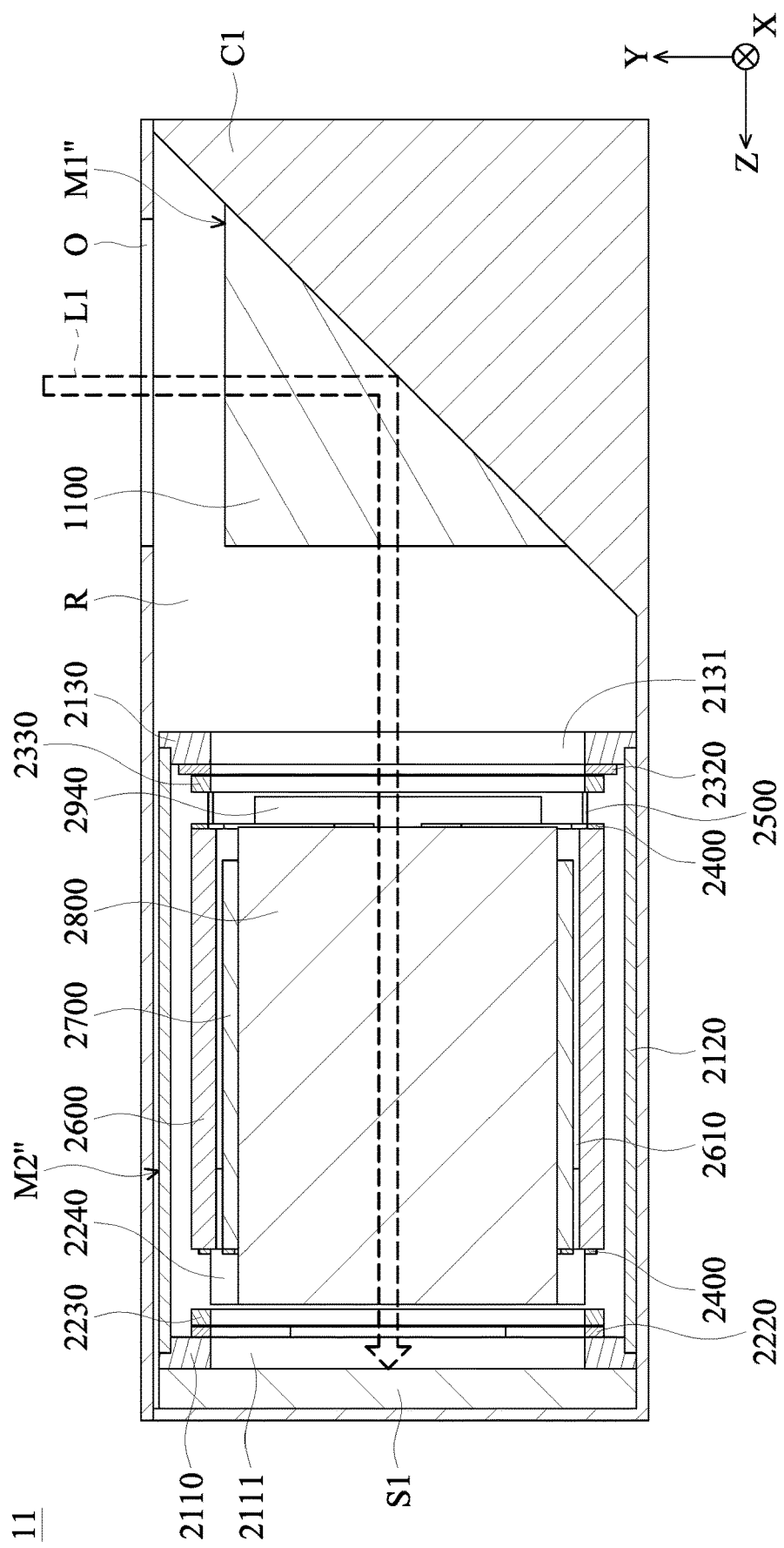
FIG. 8 shows a cross-sectional view of a telephoto lens module, in accordance with another embodiment of the invention.

FIG. 8 shows a sectional view of a telephoto lens module 11 according to another embodiment of the invention. In this embodiment, the first assembly M1" includes a reflecting element affixed to the housing C1, and light L1 is reflected by the first assembly M1" and propagate through the second assembly M2" to the first image sensor S1 along the Z axis.

Figure 9:
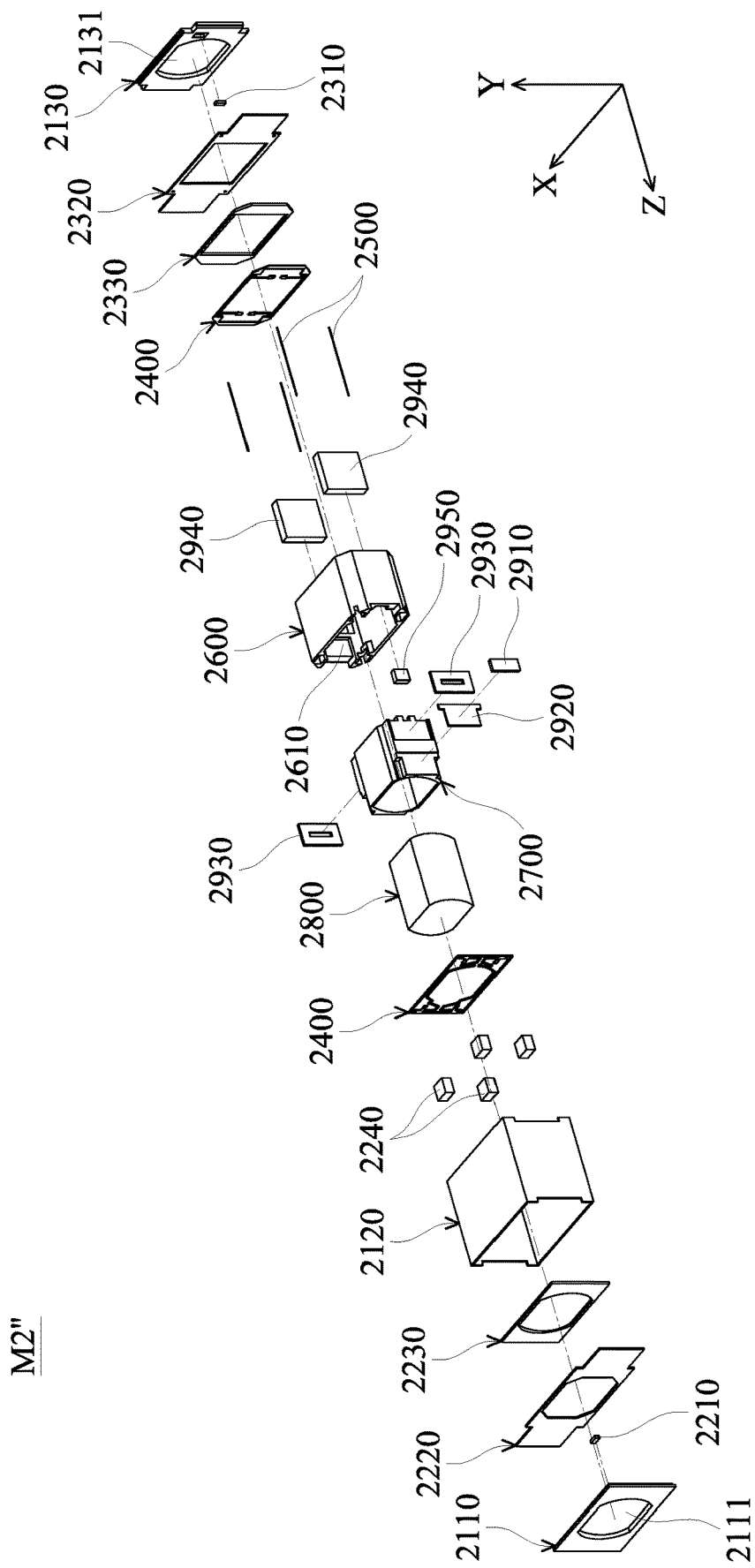
FIG. 9 shows an exploded diagram of the second assembly M2" in FIG. 8.

FIG. 9 shows an exploded diagram of the second assembly M2" in FIG. 8. As shown in FIGS. 8 and 9, the second assembly M2" primarily includes a top cover 2110, a casing 2120, a bottom cover 2130, a first lens 2800, and a second driving mechanism, wherein the second driving mechanism includes a first axial position sensor 2210, a first axial printed circuit board 2220, a first axial coils 2230, a plurality of first axial magnetic elements 2240, a second axial position sensor 2310, a second axial printed circuit board 2320, a second axial coils 2330, two second resilient elements 2400, a plurality of flexible members 2500, a second frame 2600, a second holder 2700, a third axial position sensor 2910, a third axial printed circuit board 2920, two third axial coils 2930, two third axial magnetic elements 2940, and a third axial sensing object 2950.

The two second resilient elements 240 are located on opposite sides of the second holder 2700 and connect the second frame 2600 with the second holder 2700, so that the second holder 2700 is suspended and movable within a hollow portion 2610 of the second frame 2600. As the first lens 2800 is fixed in the second holder 2700, both the first lens 2800 and the second holder 2700 are movable relative to the second frame 2600. Here, the first lens 2800 is disposed in and supported by the second holder 2700.

The third axial coils 2930 in FIGS. 2 and 3 are disposed on the second holder 2700, and the second magnetic elements 2940 are disposed on the second frame 2600, corresponding to the third axial coils 2930. Here, the third axial coils 2930 are arranged on opposite sides of the second holder 2700, and the two second magnetic elements 2940 are arranged on the inner surfaces of the second frame 2600. When an electrical current is applied to the third axial coil 2930, a magnetic force is generated between the third axial coil 2930 and the second magnetic elements 2940 to move the second holder 2700 and the first lens 2800 relative to the second frame 2600 along the Z axis, so as to achieve the function of auto focusing (AF).

The third axial sensing object 2950 is affixed to the second frame 2600, the third axial printed circuit board 2920 is affixed to the second holder 2700, and the third axial position sensor 2910 is disposed on the third axial printed circuit board 2920. In this configuration, when the second holder 2700 and the first lens 2800 received therein move relative to the second frame 2600 along the Z axis, the third axial printed circuit board 2920 and the third axial position sensor 2910 also move relative to the second frame 2600 along the Z axis. Thus, the positions of the second holder 2700 and the first lens 2800 relative to the second frame 2600 along the Z axis can be determined by the third axial position sensor 2910 detecting the relative position of the third axial sensing object 2950.

The second axial printed circuit board 2320 and the second axial coil 2330 are disposed between the bottom cover 2130 and the second holder 2700, and the second axial position sensor 2310 and the second axial coil 2330 are disposed on the second axial printed circuit board 2320. The second axial position sensor 2310 is used for detecting the position of the second magnetic element 2940 along the X axis. It should be noted that the second frame 2600, the second holder 2700, and the first lens 2800 can be supported by a plurality of flexible members 2500 (such as metal wires) for connecting the second axial printed circuit board 2320 to the second resilient element 2400 which is near the first magnetic elements 2240, so that the second frame 2600, the second holder 2700, and the first lens 2800 can move relative to the first and second axial printed circuit boards 2220 and 2320 along the X axis.

When an electrical current is applied to the second axial coil 2330, a magnetic force is generated between the second axial coil 2330 and the second magnetic element 2940 to move the second frame 2600, the second holder 2700, and the first lens 2800 relative to the second axial printed circuit board 2320 along the X axis, so as to achieve the function of optical image stabilization (OIS).

The first axial position sensor 2210, the first axial printed circuit board 2220, the first axial coils 2230, and the first axial magnetic elements 2240 are disposed on the same side of the second frame 2600 and the second holder 2700, opposite to the second axial coil 2330 and the second axial printed circuit board 2320. Here, the second frame 2600 and the second holder 2700 are disposed between the first and second axial coil 2230 and 2330.

The first axial coils 2230 and the first axial magnetic elements 2240 are affixed to the first axial printed circuit board 2220 and the second frame 2600, respectively. The first axial magnetic elements 2240 are disposed between the first axial coils 2230 and the second the second frame 2600. When an electrical current is applied to the first axial coils 2230, a magnetic force is generated between the first axial coils 2230 and the first axial magnetic elements 2240, to move the second frame 2600, the second holder 2700, and the first lens 2800 relative to the second axial printed circuit board 2320 along the Y axis, so that the function of optical image stabilization (OIS) can be achieved. The first axial position sensor 2210 is used for detecting the position of the first axial magnetic elements 2240 along the Y axis.

The first, second, and third axial position sensors 2210, 2310, and 2910 may be Hall, MR (Magneto Resistance), GMR (Giant Magneto Resistance), or TMR (Tunneling Magneto Resistance) sensors. In some embodiments, the third axial position sensor 2910 may be an optical or infrared sensor. When the third axial position sensor 2910 is a Hall, MR, GMR, or TMR sensor, the third axial sensing object 2950 may be a magnet. When the third axial position sensor 2910 is an optical or infrared sensor, the third axial sensing object 2950 may be a light reflecting sheet.

Referring to FIG. 9, the top and bottom covers 2110 and 2130 are disposed on opposite sides of the casing 2120 and form a box-shaped structure. The first axial position sensor 2210, the first axial printed circuit board 2220, the first axial coils 2230, the first axial magnetic elements 2240, second axial position sensor 2310, the second axial printed circuit board 2320, the second axial coil 2330, the second resilient elements 2400, the flexible members 2500, the second frame 2600, the second holder 2700, the first lens 2800, the third axial position sensor 2910, the third axial printed circuit board 2920, the third axial coil 2930, the third axial magnetic element 2940, and the third axial sensing object 2950 are all received in the box-shaped structure.

In this embodiment, as the second driving mechanism of the second assembly M2″ can drive the first lens 2800 to move along both the Y axis (first axis) and the X axis (second axis), whereby two-axial optical image stabilization (OIS) of the telephoto lens module 11 can be achieved. Moreover, as the second driving mechanism of the second assembly M2″ can also drive the first lens 2800 to move along the Z axis (third axis), the distance between the first lens 2800 and the first image sensor S1 can be rapidly adjusted to achieve auto focusing (AF). Specifically, since no magnetic element is disposed on the upper and lower sides of the second holder 2700, the dimensions and thickness of the second assembly M2″ and the telephoto lens module 11 along the Y axis can be greatly reduced.

It should be noted that each of the first assemblies M1, M1′, and M1″ can be incorporated with any one of the second assemblies M2, M2′, and M2″, and the combination of the first and second assemblies is not limited by the embodiments of the invention. For example, the first assembly M1 may be incorporated with the second assembly M2, M2′ or M2″, the first assembly M1′ may be incorporated with the second assembly M2′ or M2″, and the first assembly M1″ may be incorporated with the second assembly M2″. In some embodiments, the first assembly M1 may be used with the second assembly M2″ to facilitate a flexible and versatile control strategy for both optical image stabilization (OIS) and auto focusing (AF).

Figure 10B:
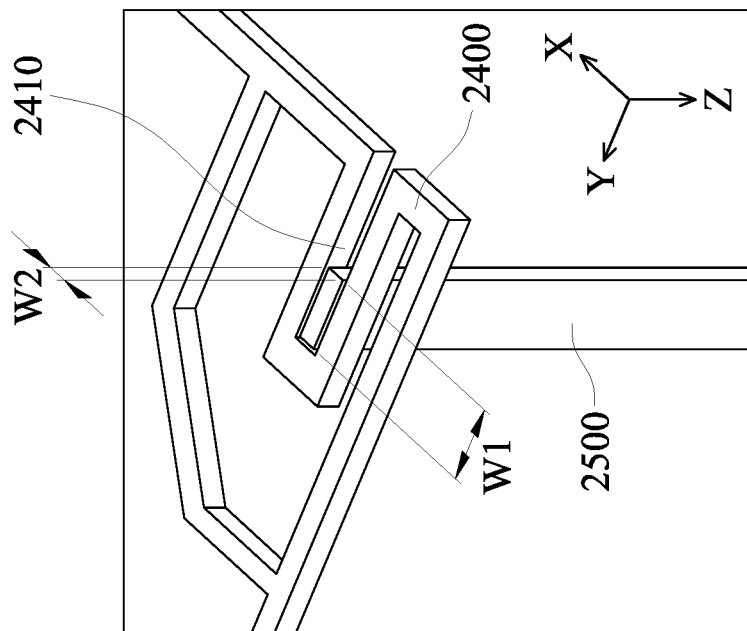
FIG. 10B shows a perspective diagram of a flexible member connecting to a resilient element, in accordance with another embodiment of the invention.
Figure 10A:
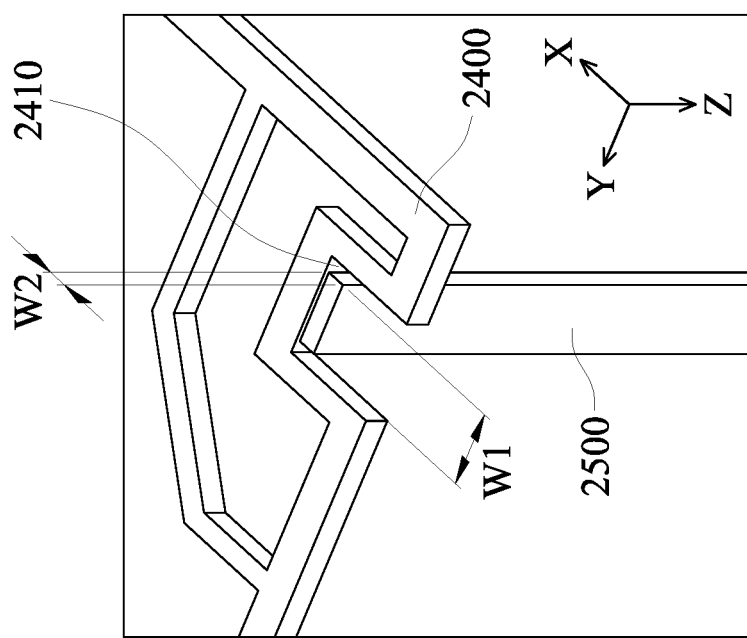
FIG. 10A shows a perspective diagram of a flexible member connecting to a resilient element, in accordance with an embodiment of the invention.

Referring to FIGS. 10A and 10B, as the displacement of the second frame 2600 and the second holder 2700 along the Y axis is usually less than that along the X axis, one of the flexible members 2500 in the second assembly M2′ or M2″ may have a rectangular cross-section, wherein the length W1 along the Y axis exceeds the width W2 along the X axis. Here, the flexible member 2500 is extended into a depressed portion 2410 of the second resilient element 2400. The opening direction and the width of the depressed portion 2410 can be modified according to the assembly type of the flexible member 2500. In the embodiment of FIG. 10A, the opening of the depressed portion 2410 is oriented toward the −X direction, and the width of the opening corresponds to the length W1 of the flexible member 2500. In the embodiment of FIG. 10B, the opening of the depressed portion 2410 is oriented toward the −Y direction, and the width of the opening corresponds to the width W2 of the flexible member 2500.

Figure 11:
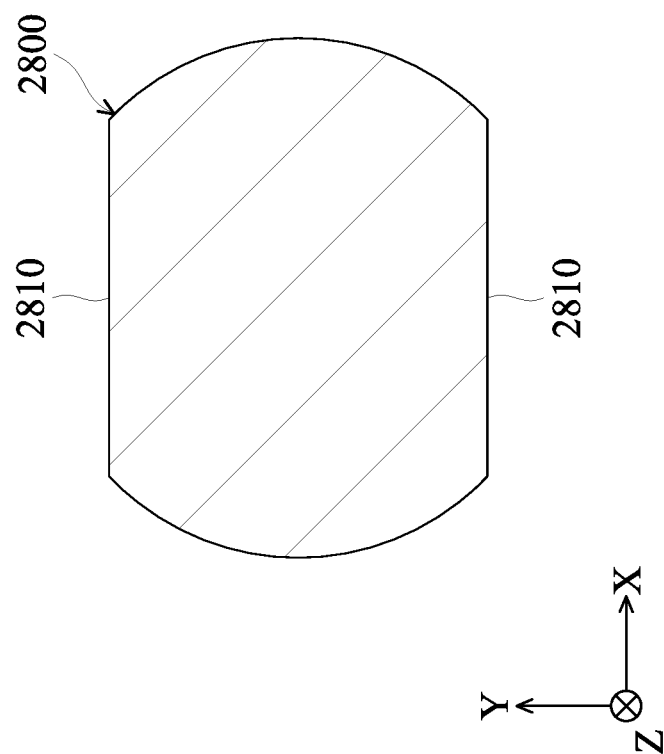
FIG. 11 shows a cross-sectional view of a first lens 2800, in accordance with an embodiment of the invention.

Referring to FIG. 11, an embodiment of the first lens 2800 forms at least a flat surface 2810 perpendicular to the Y axis. In this embodiment, two flat surfaces 2810 are formed on opposite sides of the first lens 2800, such as by a cutting process, whereby the thickness of the second assembly M2 and the telephoto lens module 11 along the Y axis can be reduced further.

Figure 12:
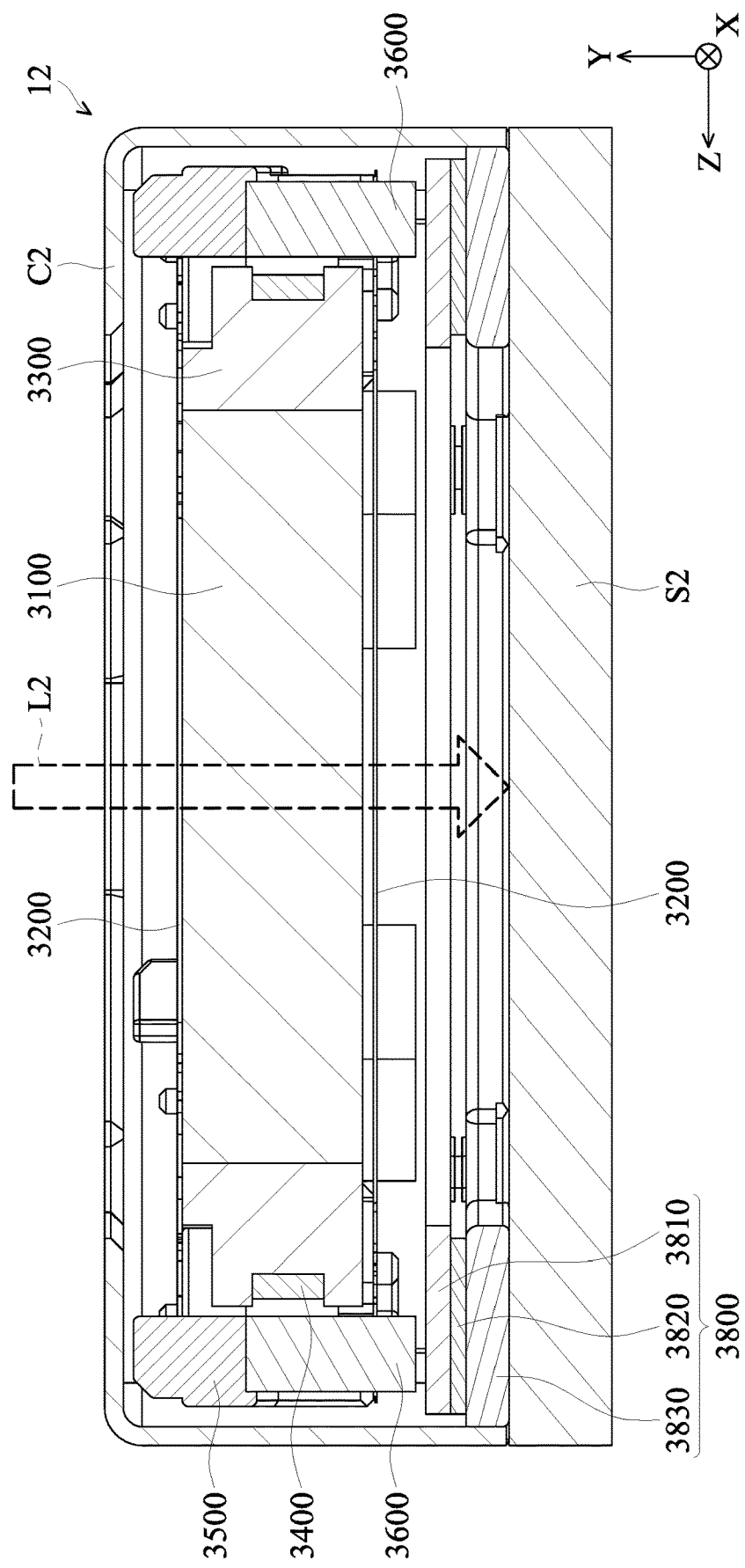
FIG. 12 shows a cross-sectional view of a wide angle lens module, in accordance with an embodiment of the invention.
Figure 13:
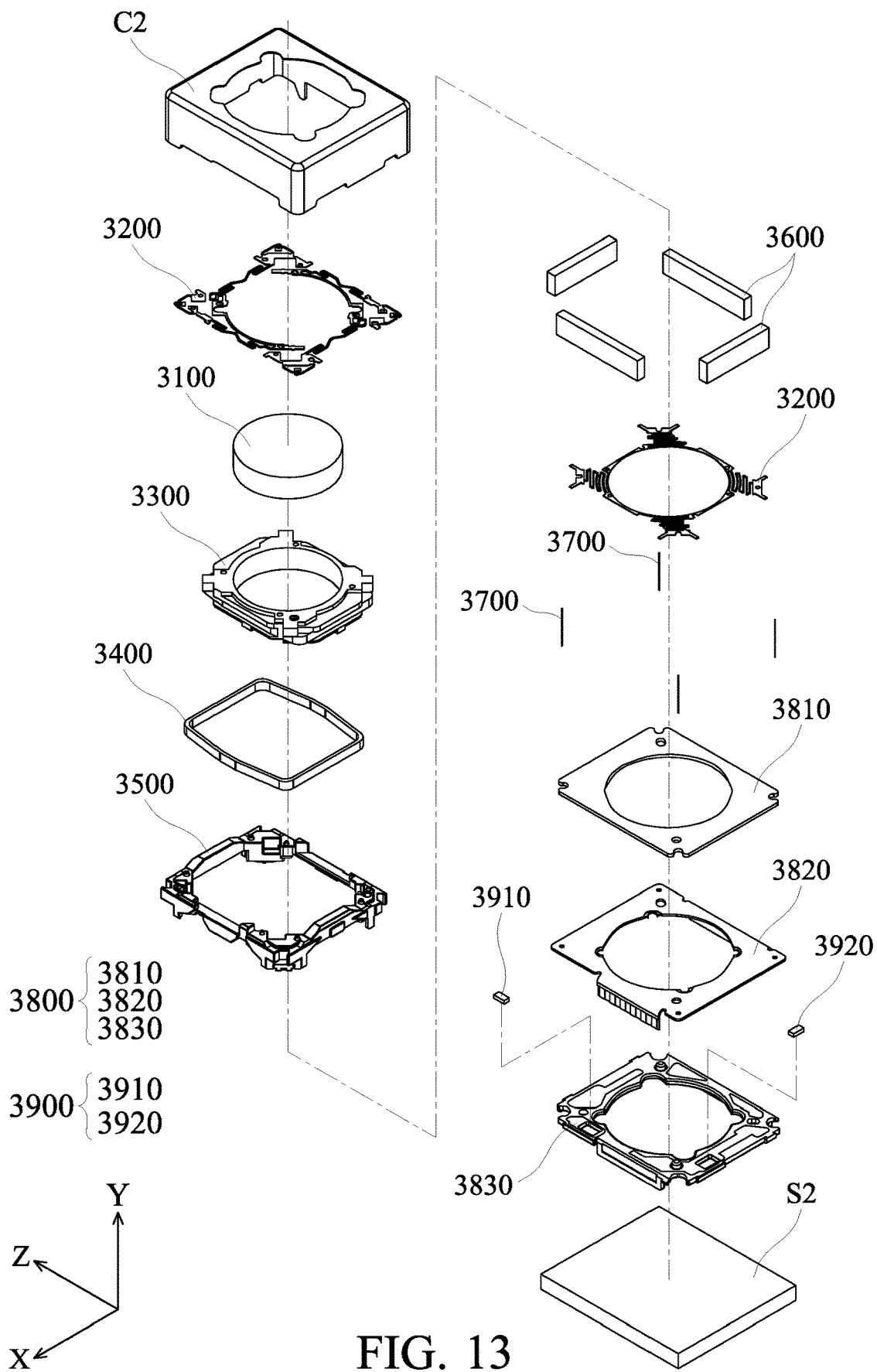
FIG. 13 shows an exploded diagram of the wide angle lens module in FIG. 12.

Referring to FIGS. 12 and 13, the wide angle lens module 12 in FIG. 1 primarily includes a housing C2, a second image sensor S2, a second lens 3100, two resilient elements 3200, a lens holder 3300, a driving coil 3400, a frame 3500, a plurality of second magnetic elements 3600, a plurality of flexible members 3700, a base 3800, and a plurality of position detectors 3900, wherein the focal length of the first lens 2800 exceeds that of the second lens 3100.

The two resilient elements 3200 are located on opposite sides of the lens holder 3300 and connect the frame 3500 with the lens holder 3300. The second lens 3100 is disposed in the lens holder 3300, and the driving coil 3400 is disposed around the lens holder 3300. The second magnetic elements 3600 are disposed on the frame 3500 and arranged around the driving coil 3400.

When an electrical current is applied to the driving coil 3400, a magnetic force is generated between the driving coil 3400 and the second magnetic elements 3600 to move the lens holder 3300 and the second lens 3100 relative to the frame 3600 along the Y axis, so that the function of auto focusing (AF) can be achieved.

The base 3800 includes a planar coil 3810, a circuit board 3820, and a bottom cover 3830. The planar coil 3810 is affixed and electrically connected to the circuit board 3820 which is affixed to the bottom cover 3830. The flexible members 3700 are connected to the planar coil 3810, the circuit board 3820, and the resilient elements 3200. Additionally, the second image sensor S2 is disposed below and affixed to the base 3800. Light L2 can enter the wide angle lens module 12 along the Y axis (first axis) and through the second lens 3100 to the second image sensor S2, so that an image can be generated on the second image sensor S2.

When an electrical current is applied to the planar coil 3810, a magnetic force is generated between the planar coil 3810 and the second magnetic elements 3600 to move the lens holder 3300, the second lens 3100 and the frame 3600 relative to the base 3800 along the X axis or the Z axis, so as to achieve the function of optical image stabilization (OIS).

The position detectors 3900 include an X-axial position detector 3910 and a Z-axial position detector 3920 affixed to the bottom cover 3830. The X-axial position detector 3910 is used to detect the positions of the second magnetic elements 3600 along the X axis, and the Z-axial position detector 3920 is used to detect the positions of the second magnetic elements 3600 along the Z axis.

The housing C2 is assembled to the bottom cover 3830, and the second lens 3100, the resilient elements 3200, the lens holder 3300, the driving coil 3400, the frame 3500, the second magnetic elements 3600, the flexible members 3700, the base 3800, and the position detectors 3900 are all received therebetween. It should be noted that the housing C2 and the bottom cover 3800 respectively form an opening corresponding to the second image sensor S2, so that light L2 can propagate through these openings and the second lens 3100 to the second image sensor S2.

Figure 14A:
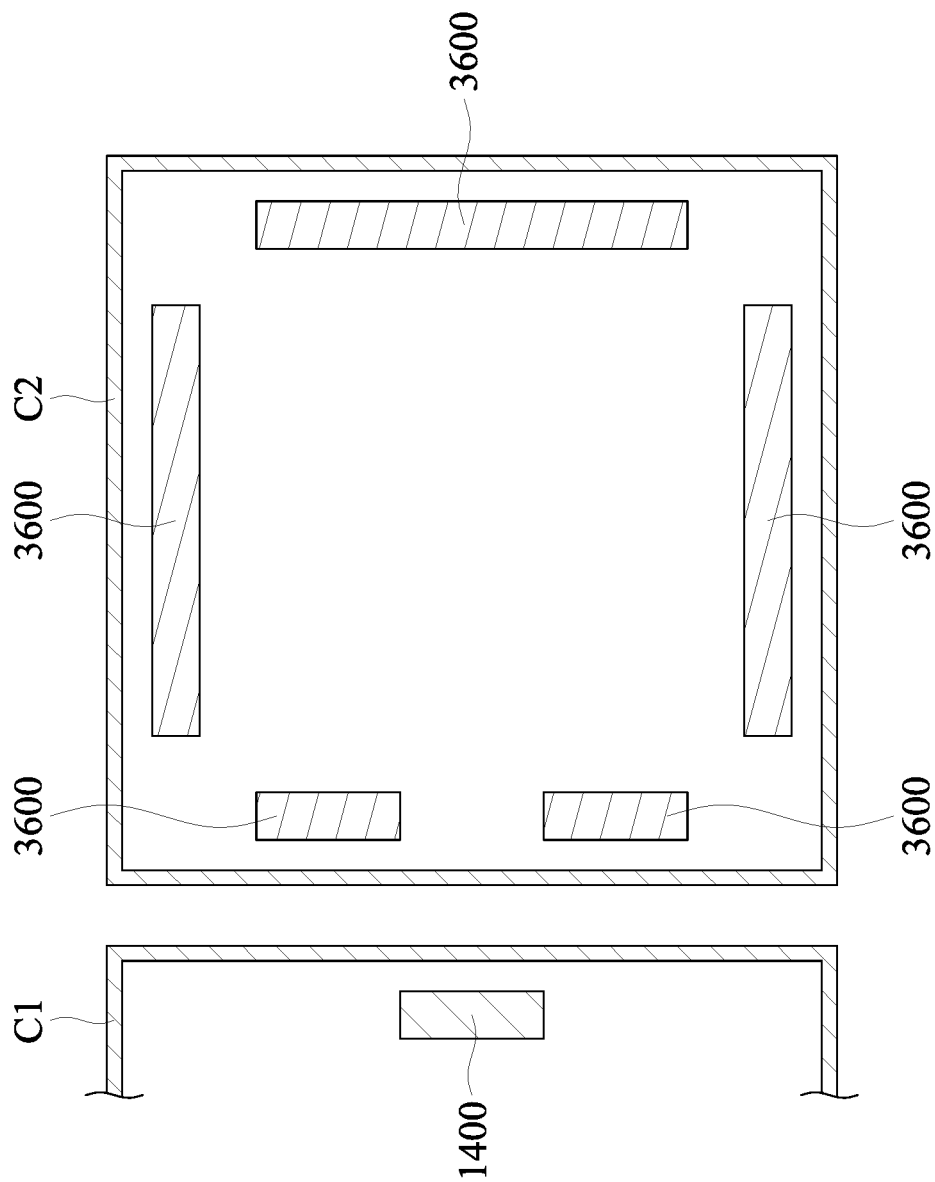
FIG. 14A shows the configuration of the second magnetic elements 3600 in the wide angle lens module 12, in accordance with an embodiment of the invention.
Figure 14:
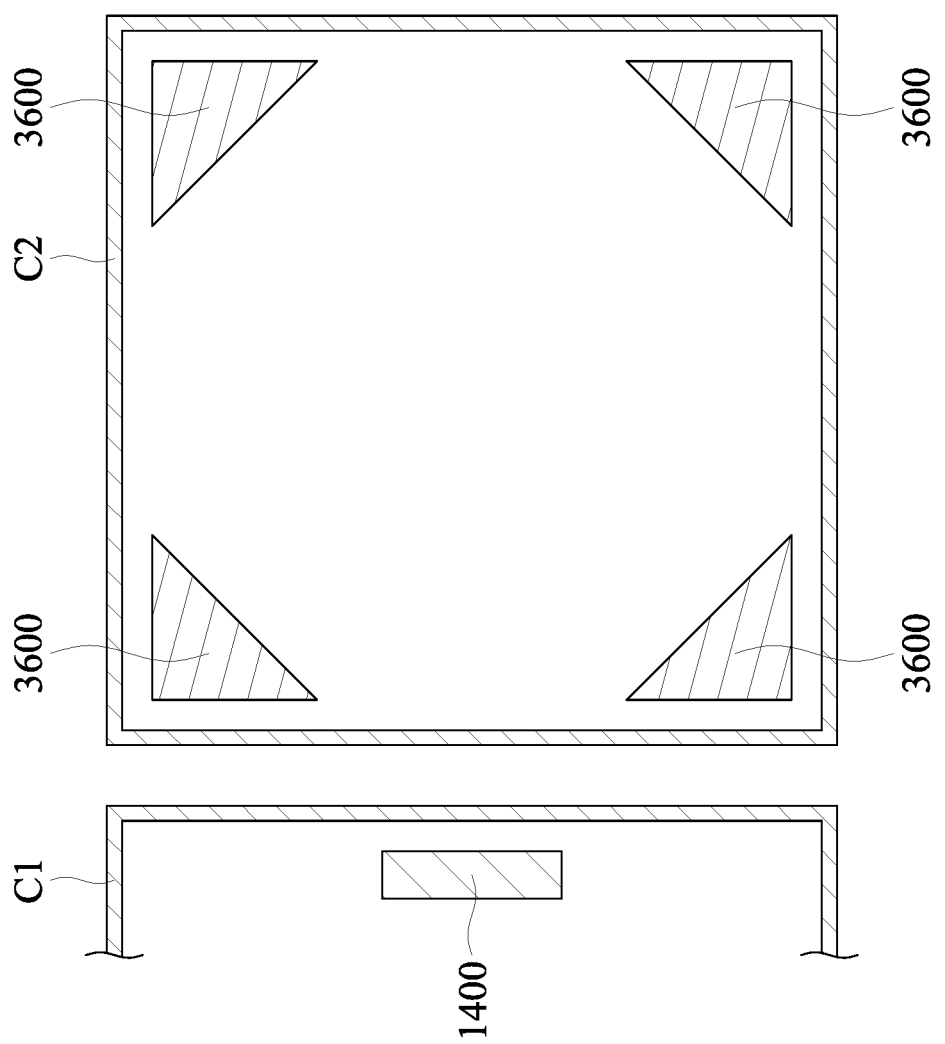
FIG. 14B shows the configuration of the second magnetic elements 3600 in the wide angle lens module 12, in accordance with another embodiment of the invention.

Referring to FIGS. 14A and 14B, the second magnetic elements 3600 on a side of the wide angle lens module 12 near the telephoto lens module 11 are configured to avoid the first magnetic elements 1400 in the telephoto lens module 11, so as to prevent magnetic interference therebetween. In some embodiments, the driving coil 3400, the frame 3500, the second magnetic elements 3600, the flexible members 3700, the base 3800, and the position detectors 3900 can be omitted from the wide angle lens module 12, and the second lens 3100 may be stationary relative to the second image sensor S2.

Figure 15:
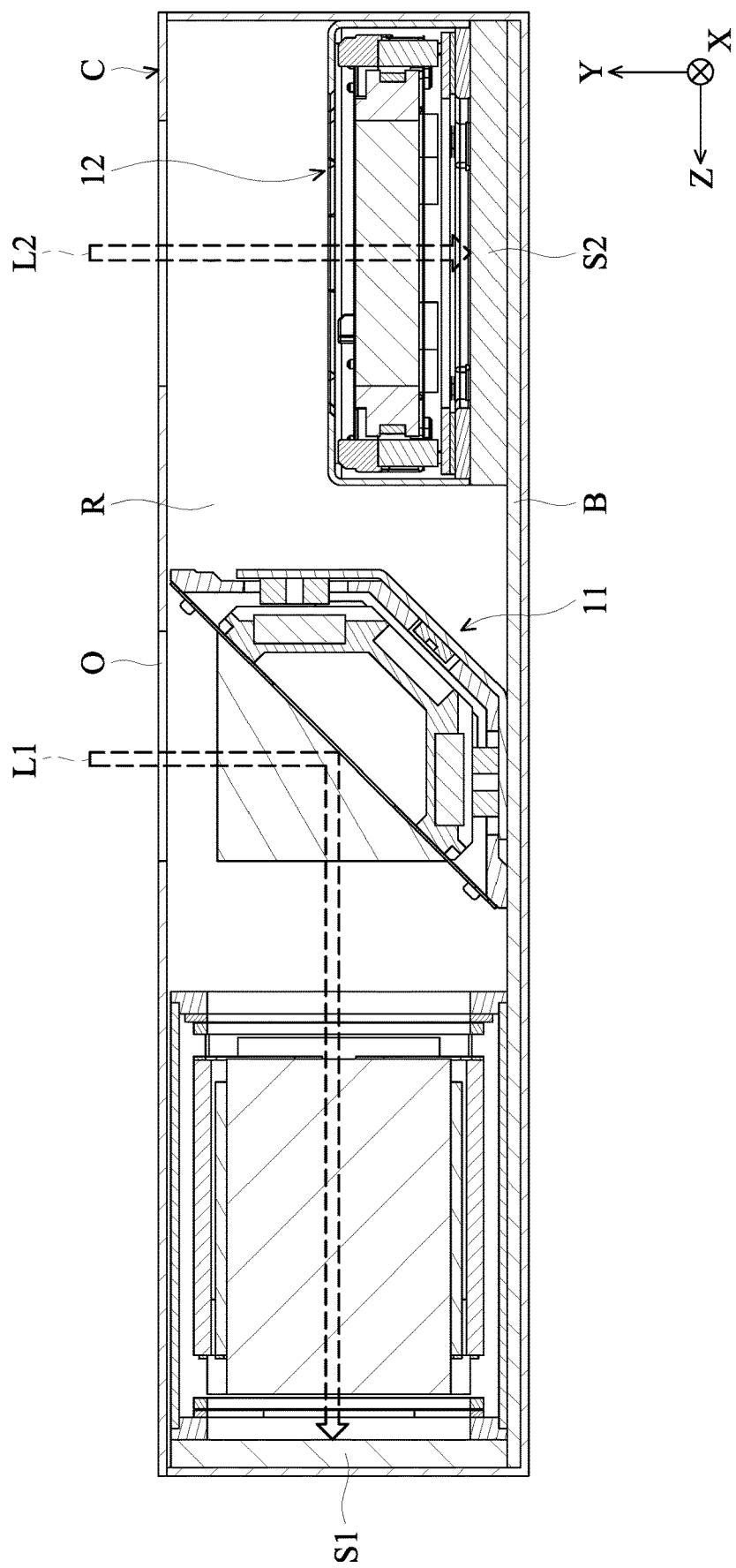
FIG. 15 shows a cross-sectional view of a camera system, in accordance with another embodiment of the invention.

In some embodiments, the housings C1 and C2 may also be integrally formed in one piece as the housing C shown in FIG. 15. The telephoto lens module 11 and the wide angle lens module 12 can be disposed in the housing C and affixed to a bottom B of the housing C. Therefore, the time required for relative height calibration between the telephoto lens module 11 and the wide angle lens module 12 can be reduced to facilitate precise and efficient assembly of the camera system.

The invention provides a camera system having at least a telephoto lens module. The telephoto lens module may have a rotatable reflecting element for reflecting light, and a second assembly provided with an optical lens. In some embodiments, by arranging the first axial magnetic element/first axial coil and the second axial coil on opposite sides of the frame in the second assembly, the thickness of the telephoto lens module can be greatly reduced to facilitate miniaturization of the camera system. In some the embodiments, the first, second, and third axes are substantially perpendicular to each other, however, they can also be either perpendicular or parallel to each other (i.e. angled to each other).

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system, comprising:
   an image sensor module receiving a light that propagates along a first direction and outputting an image signal;
   a first optical module, comprising:
      a first optical element changing a direction of the light;
      a first driving assembly driving the first optical element to move relative to the image sensor module, wherein the first driving assembly comprises:
         a first driving coil; and
         a first magnetic element having a first surface facing the first driving coil;
   a second optical module, comprising:
      a second optical element comprising an optical axis that is perpendicular to the first direction, wherein the light reaches the image sensor module through the second optical element;
      a second driving assembly driving the second optical element to move relative to the image sensor module, wherein the second driving assembly comprises:
         a second driving coil; and
         a second magnetic element having a second surface facing the second driving coil;
   wherein the first surface and the second surface face different directions, and
   wherein a shortest distance between the second driving coil and the optical axis is smaller than a shortest distance between the second magnetic element and the optical axis when viewed along the first direction.

2. The optical system as claimed in claim 1, wherein the second optical module is disposed between the image sensor module and the first optical module.

3. The optical system as claimed in claim 1, wherein the first surface and the second surface are parallel with each other.

4. The optical system as claimed in claim 3, wherein when viewed from the optical axis, the optical system is polygonal, and the first driving assembly and the second driving assembly are respectively located on different sides of the optical system.

5. The optical system as claimed in claim 4, wherein when viewed from the optical axis, the first driving assembly and the second driving assembly are respectively located on opposite sides of the second optical element.

6. The optical system as claimed in claim 4, wherein the first optical module and the second optical module are arranged along the optical axis.

7. The optical system as claimed in claim 4, wherein when viewed from the optical axis, a connecting line connecting the first driving assembly and the second driving assembly passes through the second optical element.

8. The optical system as claimed in claim 4, wherein when viewed from the optical axis, an arrangement direction of a center of the first driving assembly and a center of the first optical element is not parallel with an arrangement direction of a center of the second driving assembly and a center of the second optical element.

9. The optical system as claimed in claim 4, wherein both the first surface and the second surface are parallel with the optical axis.

10. The optical system as claimed in claim 4, wherein the direction of the light is changed from the first direction to a second direction, and the optical axis is parallel with the second direction.

11. The optical system as claimed in claim 10, wherein the first surface is parallel with both the first direction and the second direction.

12. The optical system as claimed in claim 10, wherein the second surface is parallel with both the first direction and the second direction.

13. The optical system as claimed in claim 1, wherein the first surface and the second surface are not parallel with each other.

14. The optical system as claimed in claim 13, wherein the direction of the light is changed from the first direction to a second direction by the first optical element, and the optical axis is parallel with the second direction.

15. The optical system as claimed in claim 13, wherein both the first surface and the second surface are parallel with the second direction.

16. The optical system as claimed in claim 13, wherein the first optical module and the second optical module are arranged along the optical axis.

17. The optical system as claimed in claim 13, wherein when viewed from the second direction, an arrangement direction of a center of the first driving assembly and a center of the first optical element is not parallel with an arrangement direction of a center of the second driving assembly and a center of the second optical element.

18. The optical system as claimed in claim 13, wherein when viewed from the second direction, the optical system is polygonal, and the first driving assembly and the second driving assembly are respectively located on different sides of the optical system.

19. The optical system as claimed in claim 18, wherein the first driving assembly and the second driving assembly are respectively located on adjacent sides of the optical system.

20. An optical device, comprising:
   an optical system as claimed in claim 1; and
   an additional optical system disposed adjacent to the optical system, wherein the additional optical system is closer to the first optical module than the second optical module.

* * * * *